(12) United States Patent
Diehl (10) Patent No.: US 12,095,971 B2
(45) Date of Patent: Sep. 17, 2024

(54) DEVICE AND METHOD FOR GENERATING PHOTOMETRIC STEREO IMAGES AND A COLOR IMAGE

(71) Applicant: BAUMER INSPECTION GMBH, Constance (DE)

(72) Inventor: Hans-Peter Diehl, Constance (DE)

(73) Assignee: BAUMER INSPECTION GMBH, Constance (DE)

( * ) Notice: Subject to any disclaimer, the term of this patent is extended or adjusted under 35 U.S.C. 154(b) by 77 days.

(21) Appl. No.: 17/880,682

(22) Filed: Aug. 4, 2022

(65) Prior Publication Data

US 2023/0038127 A1 Feb. 9, 2023

(30) Foreign Application Priority Data

Aug. 6, 2021 (DE) ...................... 10 2021 004 071.6

(51) Int. Cl.
| | |
|---|---|
| H04N 13/254 | (2018.01) |
| H04N 13/15 | (2018.01) |
| H04N 13/207 | (2018.01) |
| H04N 13/257 | (2018.01) |

(52) U.S. Cl.
CPC ........... H04N 13/254 (2018.05); H04N 13/15 (2018.05); H04N 13/207 (2018.05); H04N 13/257 (2018.05)

(58) Field of Classification Search
CPC .... H04N 13/15; H04N 13/207; H04N 13/254; H04N 13/257; H04N 23/56; H04N 23/60
USPC ........................................................ 348/46
See application file for complete search history.

(56) References Cited

U.S. PATENT DOCUMENTS

| | | | |
|---|---|---|---|
| 2004/0125205 A1* | 7/2004 | Geng | ................... G01S 7/4912 348/142 |
| 2018/0328855 A1* | 11/2018 | Kido | .................. G01N 21/8851 |
| 2018/0330490 A1* | 11/2018 | Kido | .................... G06T 7/0004 |
| 2020/0320680 A1 | 10/2020 | Yamagami | |

FOREIGN PATENT DOCUMENTS

| | | |
|---|---|---|
| DE | 10 2020 204 246 A1 | 10/2020 |
| WO | WO 2019/057879 A1 | 3/2019 |

OTHER PUBLICATIONS

R. Rajarshi et al.: "Error Analysis of Surface Normals Determined by Radiometry", IEEE Transactions on Pattern Analysis and Machine Intelligence, vol. 30, No. 6, pp. 631-645 (1983).

L. Laiping et al.: "3D Vision Technology and its Applications in Welding", International Conference on Control, Automation, Robotics and Vision, pp. 190-198 (2004).

* cited by examiner

*Primary Examiner* — Christopher S Kelley
*Assistant Examiner* — Ana Picon-Feliciano
(74) *Attorney, Agent, or Firm* — Norman B. Thot (57) ABSTRACT

A device for generating a photometric stereo image and a color image of an object which is moved at a predetermined relative speed relative to the device. The device includes a lighting area and a lighting arrangement which is oriented to the lighting area. The lighting arrangement cyclically emits a lighting sequence in the lighting area. The lighting sequence has at least four lighting pulses each of which have a wavelength range and a lighting direction. At least three of the at least four lighting pulses have a different wavelength range, and at least two of the at least four lighting pulses have a different lighting direction and a same wavelength range.

10 Claims, 3 Drawing Sheets

DEVICE AND METHOD FOR GENERATING PHOTOMETRIC STEREO IMAGES AND A COLOR IMAGE

CROSS REFERENCE TO PRIOR APPLICATIONS

Priority is claimed to German Patent Application No. DE 10 2021 004 071.6, filed Aug. 6, 2021. The entire disclosure of said application is incorporated by reference herein.

FIELD

The present invention relates to a device and to a method for generating photometric stereo images, and to a color image of an object moved relative to an image sensor arrangement.

BACKGROUND

Numerous industrial and scientific applications need to examine objects via an imaging technique. In the manufacturing industry, the objects may, for example, be individual or several products. In order to better detect and sort out rejects, image recordings of the products are regularly taken and evaluated to determine whether the respective product complies with specified product specifications.

Product specifications can, for example, establish requirements regarding a products' surface quality. It is frequently necessary, for example, to exclude the presence of unevenness or scratches. Other applications may in turn require that a stamping pattern attached to the products be completely and properly stamped. In photometric stereo images such as, for example, tilt images, texture images, curvature images, gradient images or height images, such three-dimensional or spatially distinct characteristics of objects can be visibly well rendered and thus be easier to examine.

Product specifications will also frequently provide defaults on two-dimensional and/or on distinctly flat characteristics, such as, for example, colorings. Unintentional discolorations can, for example, be detected or the color matching of an imprint on the objects with a printing template can be ensured. Color images of the objects must be made therefor. Color sensors or color cameras are therefore mostly used which are, however, disadvantageous especially due to their comparatively high costs of acquisition.

SUMMARY

An aspect of the present invention is to provide possibilities which allow the generation of images of the initially indicated type with low-cost expenditures, in particular without the use of color sensors or color cameras.

In an embodiment, the present invention provides a device for generating a photometric stereo image and a color image of an object which is moved at a predetermined relative speed relative to the device. The device includes a lighting area and a lighting arrangement which is oriented to the lighting area. The lighting arrangement is configured to cyclically emit a lighting sequence in the lighting area. The lighting sequence comprises at least four lighting pulses each of which have a wavelength range and a lighting direction. At least three of the at least four lighting pulses have a different wavelength range, and at least two of the at least four lighting pulses have a different lighting direction and a same wavelength range.

BRIEF DESCRIPTION OF THE DRAWINGS

The present invention is described in greater detail below on the basis of embodiments and of the drawings in which.

DETAILED DESCRIPTION

The present invention provides a device for generating photometric stereo images and the color image, wherein the device comprises a lighting area and a lighting arrangement oriented towards the lighting area, wherein the lighting arrangement is designed to cyclically radiate a lighting sequence into the lighting area, wherein the lighting sequence comprises at least four lighting pulses, wherein each lighting pulse comprises a wavelength range and a lighting direction, wherein at least three of the lighting pulses differ by their respective wavelength ranges, and wherein at least two of the lighting pulses differ by their respective lighting directions.

The device according to the present invention is advantageously able to generate (due to the different lighting directions of the lighting pulses) photometric stereo lighting which, due to the different wavelength ranges of the lighting pulses, will simultaneously render color differentiation possible.

The device according to the present invention can, for example, comprise an image data processor for the calculation of photometric stereo images and a color image of an object moved with a predetermined relative velocity relative to an image sensor arrangement with a predetermined sensor geometry, wherein the image data processor is designed to calculate the photometric stereo images and the color image from at least four image data records, wherein at least three of the image data records represent brightness values from different parts of an area of the object lit in respectively different wavelength ranges, and wherein at least two of the image data records represent brightness values of these areas of the object lit from respectively different lighting directions, wherein the image data processor is designed (based on the sensor data representing the sensor geometry and the speed values from the image data records with different wavelength ranges representing the relative velocity), to combine, as a multicolored pixel tuple, and wherein the image data processor is designed to generate brightness values of individual pixels of the same place of the object area from the image data records with different lighting directions as a multidirectional pixel tuple, and wherein the image data processor is designed to generate (based on every multicolored pixel tuple and the wavelength ranges) a pixel of the color image, and to generate (on the basis of each multidirectional pixel tuple and the lighting directions) a pixel of a photometric stereo image.

The brightness values of the image data records are in particular brightness values or intensity values measured by pixels of the image sensor arrangement. In other words, every image data record includes brightness values or intensity values measured by pixels of the image sensor arrangement under lighting in a predetermined wavelength range from a predetermined lighting direction, wherein at least three of the image data records differ due to the wavelength ranges represented therein, and wherein at least two of the image data records differ by the lighting directions represented therein. Concrete information about the different wavelength ranges and lighting directions need not, however, come from the image sensor arrangement since it is sufficient if such information is merely assignable to the image data records and in particular the brightness values included therein.

Because all brightness values are uniquely assignable to one wavelength range each, they may advantageously be available as monochromatic gray values and the pixels of the color image are nonetheless reconstructible as follows. In combination with the pertinent wavelength range, the brightness value of an individual pixel of any multicolored pixel tuple inevitably corresponds with the brightness value of a corresponding pixel of a color channel of the color image if the color channel reflects that wavelength range. Superposition of the accordingly reconstructed pixels of the color channels of all different wavelength ranges represented in the image data records from one and the same multicolored pixel tuple consequently results in the complete pixel of the color image. The entire color image results from the entirety of the generated pixels.

A similar procedure is possible in generating the pixels of a photometric stereo image. It is in this case proceeded according to the so-called photometric stereo process which is known to the expert from the state of the art and will therefore only generally be explained below. The brightness value of an individual pixel of each multidirectional pixel tuple and the associated lighting direction are entered (in accordance with the photometric stereo method) into an equation of a system of equations for the calculation of a surface normal in the place of the object area imaging the respective pixel tuple.

The system of equations here describes the qualitative connection that an object surface facing a light source will reflect more light and thus appears to be brighter for an observer (here: image sensor arrangement) than an object surface which faces away from that light source. Object surfaces standing laterally to the light source accordingly show a mean brightness. With sufficient individual pixels in the multidirectional pixel tuple, a sufficiently high number of linearly independent equations of the system of equations can be established whose set of solutions determines the surface normal. In a simple case, a differential image can be produced from only two lighting directions which can render visible many topological defects in a specific orientation. In the end, all defects in all orientations are detectable due to the calculation of additional differential images with other directional combinations.

Via an arbitrarily determinable color coding, the orientation of the surface normal calculated for the respective multidirectional pixel tuple may be allocated a color value or a gray value. This color value or gray value corresponds to the color value or gray value of the pixel in the photometric stereo image. A complete photometric stereo image results from all the pixels generated in this manner.

The present invention accordingly has the advantage that not only photometric stereo images, but also the color image, can be calculated on the basis of recorded monochromatic brightness values. The result is that no color sensor or color camera is necessary. Expenditures are correspondingly low when the image data processor is used to generate photometric stereo images and the color image.

The present invention provides a method for generating the photometric stereo image and the color image, wherein the method comprises the step of cyclical illumination of a lighting area in which the object is located with a lighting sequence, wherein the lighting sequence comprises at least four lighting pulses with each lighting pulse having a wavelength range and a lighting direction, wherein at least three of the lighting pulses differ due to their respective wavelength ranges, and wherein at least two of the lighting pulses differ by their respective lighting directions. This method provides the same advantages as the device according to the present invention described above.

The wavelength ranges may be continuous, interrupted and/or formed of individual spectral lines. Lighting directions here describe the spatial directions in which the pertinent lighting pulses spread toward the lighting area.

The present invention can be further improved via different embodiments, each of which is in itself advantageous and can be combined with each other in any manner required. These embodiments and the advantages connected therewith will be addressed below. The advantages described in relation to the image data processor and the device apply equally for the methods according to the present invention and vice versa.

According to a first possible embodiment of the present invention, the image data processor can, for example, be designed to directly read out the image data records from the image sensor arrangement after they had been recorded there. Additionally or alternatively, the image data processor can be designed to read out the image data records from the storage medium. The image data records may accordingly be saved or cached on the storage medium. If necessary, a temporal separation can thus be advantageously realized between the recording of the image data records and the calculation of the images.

In an embodiment of the device according to the present invention and/or of the method according to the present invention, the lighting sequence may also, for example, have more than four lighting pulses. In particular, at least two lighting pulses of different lighting directions may have the same wavelength range. The applied photometric stereo method is thus less vulnerable to any falsification due to the absorption of the lighting pulses. In other words, the use of the same wavelength range provides that measured brightness values purely rely on the orientation of the object surface and are not influenced by the color of the object surface.

Additionally or alternatively, at least two lighting pulses of different wavelength ranges may have the same lighting direction. Falsifications due to shadows can thus be prevented since the shadows cast can be reproduced by the same lighting direction and consequently may be identified as such.

According to another possible embodiment of the present invention, the wavelength ranges of the lighting pulses may, for example, cover an RGB color space. In other words, any of the wavelength ranges may present or form a part of the RGB color space. The wavelength ranges may thus concern the wavelength ranges of red light, green light, and blue light. This embodiment is advantageously suitable for generating RGB color images.

Additionally or alternatively, the wavelength ranges may also correspond to UV-radiation and/or IR-radiation. The color image to be calculated may then be a multispectral image in false color presentation, in particular a multispectral image or a hyperspectral image.

At least one lighting pulse, for example, each lighting pulse, can optionally form a light sheet or a light disk, respectively. In other words, the lighting pulses may be designed as light sheets or light disks directed to the lighting area. The lighting pulses may thus be distributed as homogeneously as possible over the lighting area.

As already mentioned above and according to another possible embodiment of the present invention, the device according to the present invention can, for example, have a monochromatic image sensor arrangement with a recording area, wherein the recording area of the image sensor arrangement and the lighting area overlap, and wherein the image sensor arrangement is designed to measure brightness values in the recording area during each lighting pulse. Due to the use of a monochromatic image sensor arrangement, this embodiment is advantageously characterized by particularly low costs of procurement.

According to another embodiment of the method according to the present invention, the process step of illumination can, for example, comprise the steps of emitting a lighting pulse in a first wavelength range from a first lighting direction, from a second lighting direction, from a third lighting direction, and from a fourth lighting direction; emitting a lighting pulse in a second wavelength range from each of the first, second, third and fourth lighting direction; and emitting a lighting pulse in a third wavelength range from each of the first, second, third and fourth lighting directions; wherein the first, second and third wavelength range are, among each other, not congruent, and wherein the first, second, third and fourth lighting direction are not parallel among each other. These steps can, for example, be repeated periodically.

The use of four different lighting directions adequately improves the precision of the photometric stereo method for most applications without having the computing expenditure increase disproportionately. The lighting pulses may of course be emitted from more than four different lighting directions for applications requiring yet more precise photometric stereo images.

According to another embodiment of the present invention, the lighting pulses can, for example, be individually emitted successively and each generate a unidirectional lighting constellation. Optionally, due to the simultaneous emittance of several lighting pulses with the same wavelength range and different lighting directions, a bidirectional lighting constellation or a multilaterally diffuse lighting constellation may result. This will be explained below.

For example, at least two lighting pulses in the same wavelength range may thus be emitted at the same time and generate the bidirectional lighting constellation. Vectors presenting the lighting directions of these two lighting pulses can here, for example, provide two rectified room components and one counter-directional room component. At least two additional lighting pulses in this same wavelength range can also be emitted simultaneously and generate still another bidirectional lighting constellation.

The multilateral diffuse lighting constellation mentioned previously will come about, for example, when four lighting pulses are emitted simultaneously in the same wavelength range. Vectors presenting the lighting directions of these four lighting pulses show with two of the four lighting pulses only one rectified room component and two counter-directional room components. Optionally, four additional lighting pulses in the same wavelength range can also be emitted simultaneously and the remaining lighting pulses one after the other. The multilaterally diffuse lighting constellation for the last mentioned can, in retrospect, be mathematically reconstructed so that the brightness values measured during the radiated lighting pulses one after the other are averaged.

The multilaterally diffuse lighting constellation provides uniform lighting conditions for recording the brightness values for the color image. The unilateral or bidirectional lighting constellations are primarily used for recording brightness values for a photometric stereo image. Depending on how many different unilateral or bidirectional lighting constellations there are, a tilt image, a texture image, a curvature image, a gradient image and/or a height image can be calculated as a photometric stereo image. Tilt images, texture images, curvature images, gradient images and height images can also be converted with each other via numerical integration or differentiation.

The device according to the present invention may have the previously mentioned image data processor and can thus advantageously fulfill its function without other additional devices. The device may additionally or alternatively also be designed to be connected to the computer mentioned above.

The image data processor can be designed to read out, after every lighting pulse, the brightness values from the image sensor arrangement as image data records and, in so doing, assign to each brightness value the wavelength range and the lighting direction of the lighting pulse.

According to another possible embodiment of the present invention, the image sensor arrangement can, for example, show at least four pixel fields distanced from each other at a predetermined spatial distance, wherein the time interval between two consecutive lighting pulses of the lighting sequence is equal to the time during which an image of the object projected onto the image sensor arrangement advances, due to relative speed, by a distance which is equivalent to the spatial distance of two neighboring pixel fields.

Pixel synchronicity can thereby be generated between the brightness values recorded by the pixel fields. The object can, for example, therefor move in a straight line and the pixel fields are arranged precisely behind each other, with regard to the direction of movement of the object. That means that any section of the object which is photographed by the first pixel field will also be photographed by all pixel fields arranged lying behind it.

The temporal distance corresponds with a time span and/or a period of time which is calculated from the pixel distance on the object and the relative speed of the object moved relative to the image sensor arrangement.

In other words, the lighting arrangement is designed so that the temporal distance between two consecutive lighting pulses of the lighting sequence is selected so that a specific object area is sequentially depicted on the at least four pixel fields. Pixel synchronicity is thus advantageously provided, with the generated measuring values becoming comparable.

The pixel fields of the image sensor arrangement may, for example, be pixel lines. The spatial distance accordingly presents a line distance between the pixel lines. The image sensor arrangement can optionally provide at least one pixel line for each different lighting constellation resulting from the lighting sequence. It is thereby provided that, for every multicolored pixel tuple, a multidirectional pixel tuple can also be recorded which presents the same section of the object. The image sensor arrangement can, for example, be designed as a multi-line line camera or a matrix camera readable by lines therefor. A combination of several such cameras may optionally form the image sensor arrangement.

According to an alternative embodiment of the present invention, the number of pixel lines of the image sensor arrangement can, for example, also be smaller than the number of the different lighting constellations resulting from the lighting sequence. Pixel lines are thus in fact missing to photograph every object area of the object moved in every different lighting constellation; however, the pixel synchronicity already defined above can be realized sufficiently precisely. For every "missing" pixel line, brightness values for one lighting constellation each must be recorded "between" the existing pixel lines. In other words, the temporal distance to the lighting pulse of the previous lighting constellation must be smaller than the time during which the picture and/or image of the object projected onto the image sensor arrangement is pushed forward due to the relative speed by the distance which is equivalent to the line distance of two neighboring pixel lines.

For example, in one application, the image sensor arrangement may have only two pixel lines while the lighting arrangement emits a lighting sequence with four different lighting constellations. In another application case, the image sensor arrangement may have four pixel lines while the lighting arrangement emits a lighting sequence with six different lighting constellations. The number of pixel lines and lighting sequences is in principal variable, but, the number of pixel lines is in every case smaller than the number of the lighting sequences.

Basically, however, there are not enough pixel lines in these cases to photograph every object area of the object moved in each of the different lighting constellations. In order to nonetheless achieve at least in parts the pixel synchronicity previously mentioned, for at least two lighting constellations, the time interval between two consecutive lighting pulses must be smaller than the time during which the picture of the object projected on the image sensor arrangement pushes forward due to the relative speed by the distance which is equivalent to the spatial distance of two neighboring pixel lines. Brightness values for these lighting constellations must accordingly be recorded "between" the pixel lines. The offset between the two pixel lines recorded shortened is here, for example, 50%, for example, less than 25%, for example, less than 10% of the pixel width of an individual pixel of the image sensor arrangement. Such precision is sufficient for most applications and will still be regarded as pixel synchronicity within the scope of the present invention. If this somewhat imprecise pixel synchronicity is not sufficient, the brightness values can be additionally approximated by interpolation or averaging two pixel lines.

Even with not directly neighboring pixel lines, the above-mentioned pixel synchronicity can be sufficiently realized if the lighting constellations "inserted in between" are generated in the shortest possible time space to the respective prior lighting constellation and if the measurement of the brightness values is performed immediately. That means in this case that many lighting constellations "inserted in between" are being generated while the picture and/or image of the object projected on the image sensor arrangement pushes forward due to the relative speed by the distance which is equivalent to the line distance of two neighboring pixel lines.

The straight movement of the object mentioned further above can be generated, for example, by conveying equipment. The device according to the present invention may accordingly feature the conveying equipment, and the method according to the present invention can comprise the steps of driving the conveying equipment, moving the object through the lighting area and through the recording area of the monochromatic image sensor arrangement, and recording the brightness values in the recording area during each lighting pulse. Endless recordings are possible with this embodiment so that it is in particular suitable for applications with elongated or continuous objects.

Relative speed and sensor geometry can, for example, be constant. Depending on the application, speed values and/or sensor data may change in time. The image data processor can in both cases be designed to read out or receive the speed values and the sensor data, for example, via one interface or one interface each.

It is also provided for further training and education within the scope of the method according to the present invention that a monochromatic image sensor arrangement is provided with at least four pixel fields spaced from each other at a predetermined spatial distance, wherein the time interval between two consecutive lighting pulses of the lighting sequence is selected so as to be smaller/equal to the time during which an image of the object projected onto the image sensor arrangement advances, due to relative speed, by a distance which is equivalent to the spatial distance of two neighboring pixel fields.

The present invention will be explained in greater detail and exemplarily under reference to the drawings. The combination of characteristics exemplarily presented with the forms of embodiment shown may be supplemented by additional characteristics, in accordance with the explanations above, corresponding, for a specific case of application, to the necessary properties of the image data processor and/or the device according to the present invention. In accordance with the explanations above, individual characteristics may also be left out with the embodiment described if the effect of this characteristic is not important in a concrete case of application. In the drawings, the same references are always used for elements of the same function and/or the same structure.

In the following, an image data processor 1 is described with reference to FIG. 1. Exemplary embodiments of a device 2 according to the present invention are also described on the basis of FIGS. 2 and 3. Although some aspects of the present invention are merely described within the scope of the device 2, it is of course possible that these aspects also present a description of the corresponding method wherein, for example, a block, a module, a unit or a device corresponds with a method step or a function of a method step. Analogously, aspects described within the scope of a method step also accordingly present a description of a block, a module, a unit or a property of the device 2.

Figure 1:
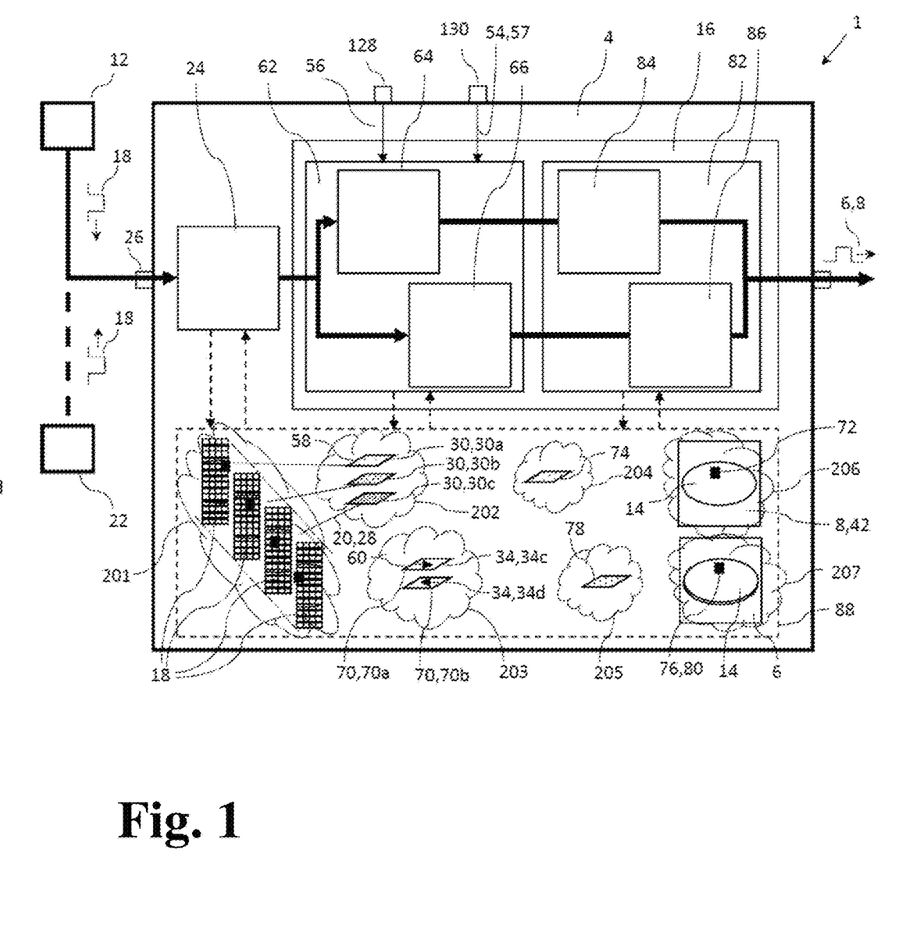
FIG. 1 shows a schematic presentation of an image data processor in accordance with an exemplary embodiment of the present invention.

FIG. 1 shows a highly simplified, schematic presentation of an exemplary embodiment of the image data processor 1. The image data processor 1 may have an independent processor board 4 and/or may be integrated on a processor board (not shown) of device 2 (see FIGS. 2 and 3). The below described blocks, modules, and units of the image data processor 1 which may be implemented, in each case, in hardware, software or in a combination thereof.

The image data processor 1 is intended for the calculation of photometric stereo images 6 as well as of a color image 8 of an object 14 moved with a predetermined relative speed 10 relative to a monochromatic image sensor arrangement 12 (see FIGS. 2 and 3) with a predetermined sensor geometry. The image data processor 1 is designed to calculate (in an image calculation unit 16) the photometric stereo images 6 and the color image 8 from at least four image data records 18. This will be explained in greater detail below.

FIG. 1 on the left suggests that the image data records 18 can be directly read out, for example, from individual monochromatic pixels 20 of the image sensor arrangement 12 after they were recorded there consecutively, as will be explained further below. The image data records 18 can alternatively also be stored on a storage medium 22 and read from there. For reading out (see thought bubble 201 in FIG. 1), the image data processor 1 can provide a corresponding readout unit 24 and a readout interface 26.

According to the present invention, the image data records 18 include monochromatic gray values constituting brightness values 28 of different sections of an area of an object 14. At least three of the image data records 18 here represent brightness values 28 of the object 14 lit in respectively different wavelength ranges 30. Such image data records 18 are designated in FIG. 1 exemplarily as image data record group 32a. At least two of the image data records 18 represent brightness values 28 of the object 14 lit from respectively different lighting directions 34. Such image data records 18 are designated in FIG. 1 exemplarily as image data record group 32b.

In other words, every image data record 18 includes (under lighting in a predetermined wavelength range 30 from a predetermined lighting direction 34) brightness values 28 measured by the image sensor arrangement 12 at different points of the object 14, wherein at least three of the image data records 18 differ due to the wavelength ranges 30 represented therein (i.e., image data record group 32a) and wherein at least two of the image data records 18 differ by the lighting directions 30 presented therein (i.e., image data records group 32b). As can be seen, the same image data records 18 may simultaneously belong to the image data records group 32a and 32b.

As will still be explained further below, the different wavelength ranges 30 may concern, for example, the wavelength ranges of red light 36, green light 38, and blue light 40. The wavelength ranges 30 may accordingly cover an RGB color space and the color image 8 to be calculated may be an RGB color image 42. Additionally or alternatively, UV-radiation and/or IR-radiation may also be used in lighting. The color image 8 to be calculated may then be a multispectral image in false color presentation, in particular a multispectral image or a hyperspectral image.

As will also be still explained further below, the different lighting directions 34 may result from a unidirectional lighting constellation 44, a bidirectional lighting constellation 46, or a multilaterally diffuse lighting constellation 48. The unidirectional or bidirectional lighting constellations 44, 46 are primarily used for recording brightness values 28 for the photometric stereo image 6. Depending on how many unidirectional or bidirectional lighting constellations 44, 46 are available, a tilt image may be calculated, or a texture image, a curvature image, a gradient image and/or a height image(s) as a photometric stereo image 6. The multilaterally diffuse lighting constellation 48 provides uniform lighting conditions for recording the brightness values 28 for the color image 8.

Further below, in connection with the device 2 according to the present invention, the precise coming about of the lighting constellations 44, 46, 48 in the different wavelength ranges 30 and from the different lighting directions 34 will be explained in greater detail. The image data processor 1, in particular the readout unit 24, can be designed to allocate to every brightness value 28 the associated wavelength range 30 and the associated lighting direction 34.

For improved understanding, in the presentation of the image data records 18 in FIG. 1, the brightness values 28 are allocated to the individual pixels 20 of the image sensor arrangement 12 from which they had been recorded and shown together with the entire object 14, the different wavelength ranges 30, and the different lighting directions 34. Concerned are here respectively top views 50 on object 14 from the perspective of the image sensor arrangement 12. The respective lighting constellation 44, 46, 48 at hand is suggested by arrows in the top views 50, wherein different arrow directions present different lighting directions 34 while different arrow lines (for example, dot/dash, solid line, thick line) render the different wavelength ranges 30.

Brightness values 28 of the image data records 18 can be measured by the image sensor arrangement 12 using an electronic lock. It is accordingly identifiable that the image sensor arrangement (via which the image data records 18 are recorded) has four pixel lines 52a, 52b, 52c, 52d. The already above-mentioned sensor geometry is in that case primarily defined by the mutual spatial distance 54 of the pixel lines 52a, 52b, 52c, 52d (i.e., line space 124).

The image data processor 1 is furthermore designed to identify (on the basis of the spatial distance 54 and on the basis of speed values 56 representing the predetermined relative speed 10) from the image data records 18 with different wavelength ranges 30, in particular from the respective image data record groups 32a, brightness values 28 of individual pixels 20 of the same place of the object area and to summarize them as a multicolored pixel tuple 58 (see thought bubble 202 in FIG. 1). The image data processor 1 is moreover designed to identify (on the basis of the spatial distance 54 and the speed values 56 from the image data records 18 with different wavelength ranges 34, in particular from the respective image data record groups 32b) brightness values of individual pixels 20 at the same place of the object area and to summarize them as a multidirectional pixel tuple 60 (see thought bubble 203 in FIG. 1). The image calculation unit 16 can show a pixel tuple identification module 62 with a block 64 for identifying and summarizing multicolored pixel tuples 58 and a block 66 for identifying and summarizing multidirectional pixel tuples 60 therefor.

Every multicolored pixel tuple 58 is a tuple of length n and includes, as elements, the brightness values 28 from the image data records 18 with different wavelengths ranges 30 which were measured by pixels of the image sensor arrangement 12 at one and the same place of the object area, with length n being equivalent to the number of different wavelengths ranges 30. Analogously, every multidirectional pixel tuple 60 is a tuple of length m and includes, as elements, brightness values 28 from the image data records 18 with different lighting directions 34 which were measured by pixels of the image sensor arrangement 12 at one and the same place of the object area, with length m being equivalent to the number of different lighting directions 34.

Image data records 18 can, for example, be recorded so that, for every multicolored pixel tuple 58 a multidirectional pixel tuple 60 is also available which images the same place of the object area and vice-versa. This will be explained still further below in connection with the device 2 according to the present invention and enables the generation of pixel synchronicity between the color components of the color image 8 and the photometric stereo image 6.

Brightness values 28 of every multicolored pixel tuple 58 can, for example, be uniquely assignable to a wavelength range 30 due to their arrangement within the multicolored pixel tuple 58. The brightness values 28 of every multidirectional pixel tuple 60 are accordingly uniquely assignable to a lighting direction 34, due to their arrangement within the pixel tuple 60. In FIG. 1, this is suggested, in a purely exemplary fashion, for pixel tuple 58, 60 with three/two elements 70 (see thought bubbles 202, 203). Multicolored pixel tuples 58 and the multidirectional pixel tuples 60 can, of course, differ by their number of elements 70.

The image data processor 1 is further designed to generate a pixel 72 of the color image 8 on the basis of every multicolored pixel tuple 58 and the wavelength ranges 30, in particular the wavelength ranges 30 of the multilaterally diffuse lighting constellations 48 (see thought bubble 204 in FIG. 1). Since all brightness values 28, as already described above, are merely available as monochromatic gray values; assignable, however, to a wavelength range 30; pixel 72 of the color image 8 can be reconstructed as follows. The brightness value 28 of an element 70 of the multicolored pixel tuple 58 in combination with the associated wavelength range 30 is in accordance with the brightness value 28 of a pixel 74 of a color channel of the color image 8, wherein the color channel reflects this wavelength range 30. Superposition of the accordingly reconstructed pixels 74 of different wavelength ranges 30 from one and the same multicolored pixel tuple 58 consequently results in the complete pixel 72 of the color image 8. The entire color image 8 results from the entirety of the generated pixels 72 (see thought bubble 206 in FIG. 1).

The image data processor 1 is moreover designed, based on each multidirectional pixel tuple 60 and the lighting directions 34, in particular the lighting directions 34 of the directional lighting constellations 44, 46, to generate a pixel 76 of the photometric stereo image 6 (see thought bubble 205 in FIG. 1). In generating pixel 76, it is proceeded according to the so-called photometric stereo process which is known to the expert from the state of the art and will therefore only be generally explained below. Brightness value 28 of every element 70 of the multidirectional pixel tuple 60 and the associated lighting direction 34 are entered according to the photometric stereo method into an equation of a systems of equations for the calculation of a surface normal in the place of the object area imaging the respective multidirectional pixel tuple 60.

The system of equations here describes the qualitative connection that an object surface facing a directional light source will reflect more light, and thus appears to be brighter for an observer (here: image sensor arrangement 12), than an object surface which faces away from that light source. Object surfaces standing laterally to the light source accordingly show medium brightness. With sufficient elements 70 in the multidirectional pixel tuple 60, a sufficiently high number of linearly independent equations of the system of equations can be established whose set of solutions determines the surface normal.

Via an arbitrarily determinable color coding, the orientation of the surface normal calculated for the multidirectional pixel tuple 60 may be allocated a color value or a gray value 78. This color value or gray value 78 then corresponds with the color value or gray value 80 of the pixel 76. The entire photometric color image 6 results from the entirety of the pixels 76 generated in this manner (see thought bubble 207 in FIG. 1).

For the purpose of generating pixels 72, 76, the image calculation unit 16 may present a pixel generating module 82 with a block 84 for generating the pixels 72 of the color image 8 and a block 86 for generating pixels 76 of the photometric stereo image 6. Based on the already mentioned pixel synchronicity, the color image 8 and the photometric stereo image 6 can be optionally combined (in the image calculation unit 16) to a photometric stereo color image.

The image data processor 1 may optionally be provided with an internal data storage device 88 which is designed to save or cache intermediate results of the process steps running in the image data processor 1. Thought bubbles 201, 202, 203, 204, 205, 206 and 207 of FIG. 1 here merely present a symbolization of the process steps running in the image data processor 1. Their placement in the area of the internal data storage device 88 is due to reasons of space and should not mean that such graphic reproduction must take place in the image data processor 1 or in the internal data storage device 88.

Figure 2:
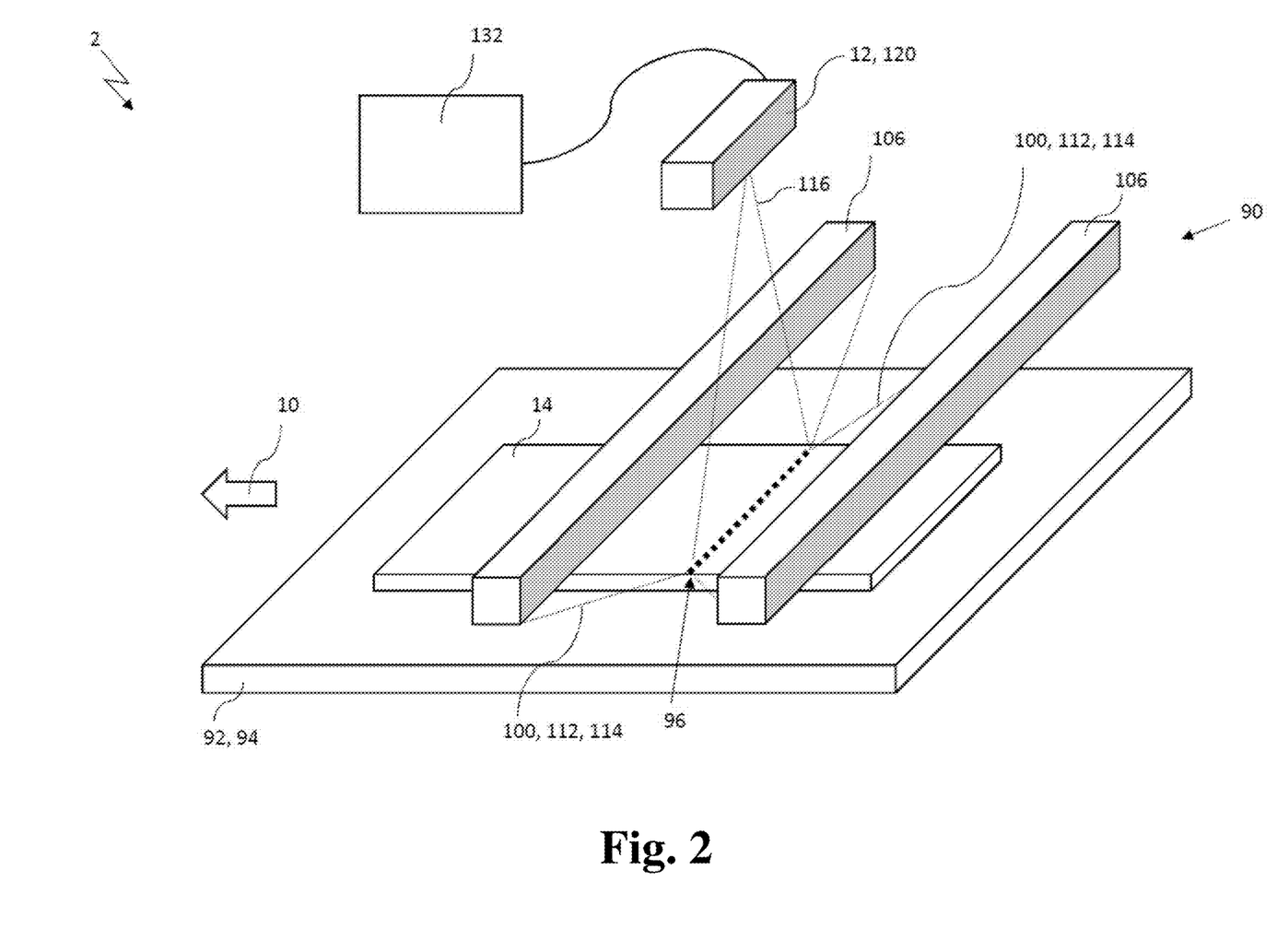
FIG. 2 shows a schematic presentation of a device according to the present invention in accordance with an exemplary embodiment of the present invention.
Figure 3:
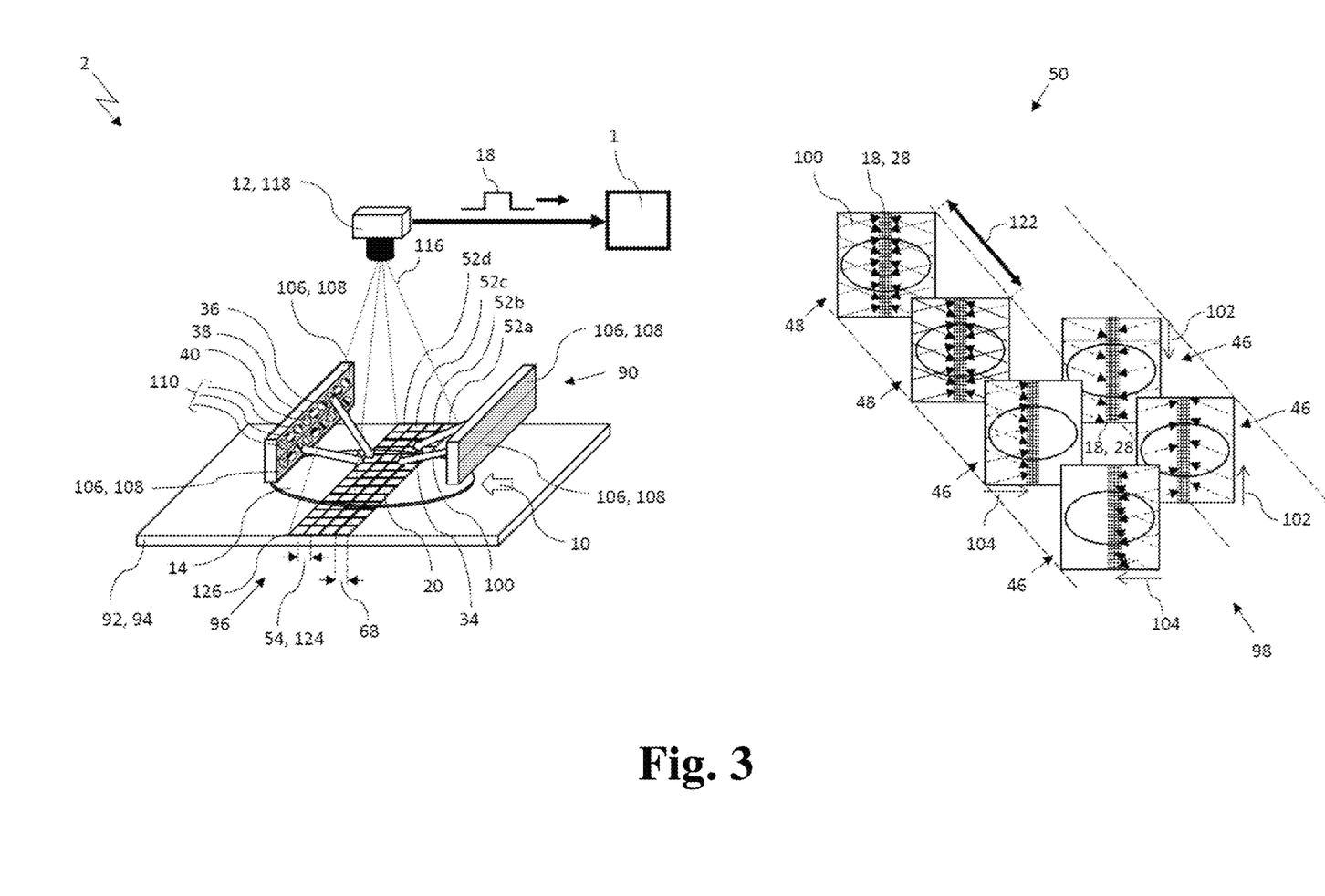
FIG. 3 shows a schematic presentation of a device according to the present invention in accordance with another exemplary embodiment of the present invention.

FIGS. 2 and 3 show schematic presentations of exemplary forms of embodiments of the device 2 according to the present invention which shows the image sensor arrangement 12 and a lighting arrangement 90 which has previously been mentioned above. The structure and function of the lighting arrangement 90 will be explained below with reference to FIG. 2 in which the image sensor arrangement 12 is presented in a highly simplified manner. The image sensor arrangement 12 is, in turn, described with reference to FIG. 3 in which the lighting arrangement 90 is presented merely in a highly simplified manner for reasons of a better overview.

Device 2 serves to generate the photometric stereo image 6 and the color image 8. The lighting arrangement 90 of device 2 in particular serves to generate the lighting constellations 44, 46, 48 and the image sensor arrangement 12 of device 2 to record brightness values 28 for image data records 18. In order to generate the relative velocity 10, device 2 can furthermore be provided by conveying equipment 92, for example, with a conveyor belt 94, on which object 14 is movable relative to device 2, in particular relative to the image sensor arrangement 12. Additionally or alternatively, device 2, in particular image sensor arrangement 12, can also be movably designed relative to object 14.

The lighting arrangement 90 is oriented towards a lighting area 96 and is designed to cyclically illuminate a lighting sequence 98 in the lighting area 96. The lighting sequence 98 is provided with at least four lighting pulses 100 which can, for example, be periodically repeated, wherein each lighting pulse 100 has a wavelength range 30 and a lighting direction 34. The wavelength range 30 can here be formed continuously, interrupted or formed from individual spectral lines. The lighting direction 34 here is the spatial direction in which the pertinent lighting pulse 100 spreads towards the lighting area 96.

At least three of the lighting pulses 100 are different due to their respective wavelength ranges 30, and at least two of the lighting pulses 100 are different due to their respective lighting directions 34 which is reflected in the image data record groups 32*a*, 32*b* previously mentioned.

Lighting pulses 100 can be individually emitted from the lighting arrangement 90 and respectively generate a unidirectional lighting constellation 44. Optionally, due to the simultaneous emission of several lighting pulses 100 with the same wavelength range 30 and different lighting directions 34, a bidirectional lighting constellation 46 (see FIG. 3) or a multilaterally diffuse lighting constellation 48 may result. This will be explained below.

The lighting arrangement 90 can be designed, for example, to emit a first lighting pulse 100*a* in a first wavelength range 30*a* from a first lighting direction 34*a*, a second lighting pulse 100*b* in a second wavelength range 30*b* from a second lighting direction 34*b*, and a third lighting pulse 100*c* in a third wavelength range 30*c* from a third lighting direction 34*c*, wherein the wavelength ranges 30*a*, 30*b*, 30*c* are, among each other, not congruent, and wherein the lighting directions 34*a*, 34*b*, 34*c* are not parallel among each other. All lighting directions may, however, intersect in the lighting area 96.

As presented top left in the top views 50 of FIG. 1, each lighting pulse 100a, 100b, 100c is individually emitted and each generates precisely one unidirectional lighting constellation 44. Lighting pulses 100a, 100b, 100c may be periodically repeated.

The lighting arrangement 90 may furthermore be designed to emit a fourth lighting pulse 100d in the third wavelength range 30c from the lighting direction 34d, the lighting directions 34c, 34d not being parallel among each other.

In other words, the lighting arrangement 90 may be designed to emit precisely one lighting pulse in the first wavelength range from each of the first, second, third and fourth lighting direction; precisely one lighting pulse in the second wavelength range from each of the first, second, third and fourth lighting direction; and precisely one lighting pulse in the third wavelength range from each of the first, second, third and fourth lighting direction. This is not separately shown. In that case, correspondingly more pixel lines would also need to be made available. Actually, exactly the number of wavelengths multiplied by the number of directions.

Two lighting pulses 100 can also be emitted at the same time in the same wavelength range 30 in order to generate a bidirectional lighting constellation 46. The lighting directions of the two simultaneously emitted lighting pulses can, for example, be provided with a rectified horizontal component 102 and one counter-directional horizontal component 104. The remaining lighting pulses in the same wavelength range 30 will thereafter, for example, also be emitted at the same time. This is presented in the top views 50 of FIG. 3.

As shown in FIG. 3, lighting arrangement 90 may be provided with at least three electromagnetic beamers 106 oriented towards the lighting area 96, each being designed to emit precisely one of the lighting pulses 100 in precisely one wavelength range 30 and precisely one lighting direction 34 so that the lighting sequence 98 develops which is presented top left in the top views 50 of FIG. 1. In particular with the lighting arrangement 90 presented in FIG. 3, the electromagnetic beamers 106 are provided with a red light 36, a green light 38, and a blue light 40, where the red light 36, the green light 38 and the blue light 40 are alternately available and per electromagnetic beamer 106, radiate from different spatial directions onto the lighting area 96.

As shown in FIG. 2, the electromagnetic beamers 106 are designed so that, to the extent possible, they distribute the lighting pulses 100 homogeneous over the lighting area. Every electromagnetic beamer 106 has an optical system (not shown) oriented towards the lighting area therefor.

The lighting arrangement 90 can, for example, provide at least one combined electromagnetic beamer 106 for every different wavelength range 30 of the lighting pulses 100 and/or for each different lighting direction 34 of the lighting pulses 100. The lighting arrangement 90 (as exemplarily shown in FIG. 3 (can thus provide four electromagnetic beamers 106 which are designed as light strips 108. In every light strip 108, LEDs 110 of each of the different wavelength ranges 30 can be arranged alternatingly (for example, in the following sequence: R-G-B- . . . -R-G-B). In this respect, LEDs 110 of the same wavelength range 30 are here independently controllable from the LEDs 110 of the other wavelength ranges. Light strips 108 can also be designed so that they radiate in four different spatial orientations onto the lighting area 96. It is thereby possible to generate the lighting sequences 98 presented in the top views 50.

At least one lighting pulse 100, for example, each lighting pulse 100, can optionally form a light sheet 112 or, respectively, a light disk. Every electromagnetic beamer 106 may comprise an optical system (not shown) oriented towards the lighting area 96 therefor.

With regard to recording the brightness values 28, as previously indicated above, the image sensor arrangement 12 has a recording area 116 which is superimposed with the lighting area 96. The image sensor arrangement 12 is thereby designed so that, during each lighting pulse 100, the brightness values 28 in the recording area 116 are measured.

As previously mentioned, the image sensor arrangement 12 is provided with at least four pixel lines 52a, 52b, 52c, 52d arranged at a spatial distance 54 from each other. The image sensor arrangement 12 can in particular provide at least one pixel line for each different lighting constellation 44, 46, 48 resulting from the lighting sequence 98. It is thereby provided that, for every multicolored pixel tuple 58, a multidirectional pixel tuple 60 can also be recorded which presents the same place of the object area. The image sensor arrangement 12 can be designed therefor, for example, as a multi-line line camera 118 (see FIG. 3) or as a matrix camera 120 readable line by line (see FIG. 2). A combination of several such cameras may optionally also form the image sensor arrangement 12.

In order to achieve the previously mentioned pixel synchronicity in a simple manner, the time interval 122 between two consecutive lighting pulses of the lighting sequence 98 can, for example, be equal to the time during which the illustration of the object 14 projected onto the image sensor arrangement 12 is pushed forward via the predetermined relative speed 10 by a distance which is equivalent to the spatial distance 54 of two neighboring pixel lines. In order to realize this, the spatial distance 54 and the predetermined relative speed 10 can be specified and the time interval 122 between two consecutive lighting pulses 100 can be adjusted thereto. This adjustment may be effected, for example, by controlling the lighting arrangement 90.

The spatial distance 54 and the time interval 122 may alternatively be specified and the predetermined relative speed 10 adjusted thereto. The conveying equipment 92 may be accordingly controlled in this respect.

The time interval 122 and the predetermined relative speed 10 may furthermore be alternatively specified and the spatial distance 54 adjusted thereto. The spatial distance 54 can be structurally adjusted in advance at the image sensor arrangement 12. For the matrix camera 120, it is also conceivable that the line space 124 is influenced via which lines are read by the matrix camera 120. In order to expand the spatial distance 54, instead of every pixel line being read, for example, only every second pixel line will be read.

The number of pixel lines of the image sensor arrangement 12 can optionally also be smaller than the number of the different lighting constellations 44, 46, 48 resulting from the lighting sequence 98. This is shown in FIG. 3. The image sensor arrangement 12 there has four pixel lines 52a, 52b, 52c, 52d, while the lighting arrangement 90 is designed to emit a lighting sequence with six different lighting constellations 46, 48 (see top views 50 in FIG. 3).

There are basically thus not enough pixel lines available to record every object area of the object 14 moved in each of the six different lighting constellations 46, 48. In order to nonetheless achieve at least in parts the pixel synchronicity previously mentioned, the time interval 122 between two consecutive lighting pulses of the lighting sequence 98 must be smaller with at least two lighting constellations 46 than the time during which the picture of the object 14 projected on the image sensor arrangement 12 pushes forward due to the relative speed 10 by the distance which is equivalent to the spatial distance 54 of two neighboring pixel lines. Brightness values 28 for these lighting constellations 46 must accordingly be taken "between" the pixel lines. This is suggested in FIG. 3 by the top views 50 being arranged in a staggered manner. If directly neighboring pixel lines are concerned, brightness values 28 can be approximated by interpolation or averaging. Even with not directly neighboring pixel lines, the above-mentioned pixel synchronicity can be sufficiently realized if the lighting constellations 46 "inserted in between" are generated in the shortest possible time interval to the respectively prior lighting constellation and if the measurement of the brightness values is performed immediately.

FIG. 3 presents an imaginary grid projection 126 which suggests the object areas recorded by the individual pixel lines 52*a*, 52*b*, 52*c*, 52*d* of the image sensor arrangement. The spatial distance 54 and the pixel width 68 are suggested at the grid projection 126.

As an alternative to pixel lines, the image sensor arrangement 12 may also provide different pixel fields. The image data processor 1 is in this case arranged to identify the multicolored pixel tuples 58 and the multidirectional pixel tuples 60 based on other sensor data 57 representing the sensor geometry.

Speed values 56 and sensor data 57 can, for example, be constant. Depending on the application, speed values 56 and/or sensor data 57 may change in time. For entering or reading the speed values 56, the image data processor 1 is provided with an interface 128. Via interface 128, the image data processor 1 can be connected to an encoder (not shown) of the conveying equipment 92 (see FIG. 2) or receive from it the speed values 56 in real time. Another interface 130 for entering or reading out the sensor data 57 can optionally also be provided with the image data processor 1.

Device 2 can present the image data processor 1. Device 2 can alternatively also be connected to a computer 132 on which a computer program is executable which comprises commands causing the computer 132 to execute, for the image data processor 1, the process steps previously described.

The present invention is not limited to embodiments described herein; reference should be had to the appended claims.

LIST OF REFERENCE NUMERALS

1 Image data processor
2 Device
4 Processor board
6 Photometric stereo images
8 Color image
10 Predetermined relative speed
12 Image sensor arrangement
14 Object
16 Image calculation unit
18 Image data records
20 Individual (monochromatic) pixels
22 Storage Medium
24 Readout unit
26 Readout interface
28 Brightness values
30 Wavelength range
30*a* First wavelength range
30*b* Second wavelength range
30*c* Third wavelength range
32*a-b* Image data record group
34 Lighting direction
34*a* First lighting direction
34*b* Second lighting direction
34*c* Third lighting direction
34*d* Lighting direction
36 Red light
38 Green light
40 Blue light
42 RGB color image
44 Unidirectional lighting constellation
46 Bidirectional lighting constellation
48 Multilaterally diffuse lighting constellation
50 Top view
52*a-d* Pixel line
54 Spatial distance
56 Speed value
57 Sensor data
58 Multicolored pixel tuples
60 Multidirectional pixel tuple
62 Pixel tuple identification module
64 Block
66 Block
68 Pixel width
70 Element
72 Pixel
74 Pixel/Reconstructed pixel
76 Pixel
78 Color value or Gray value (of multidirectional pixel tuple 60)
80 Color value or Gray value (of pixel 76)
82 Pixel generating module
84 Block
86 Block
88 Internal data storage device
90 Lighting arrangement
92 Conveying equipment
94 Conveyor belt
96 Lighting area
98 Lighting sequence
100 Lighting pulse
100*a* First lighting pulse
100*b* Second lighting pulse
100*c* Third lighting pulse
100*d* Fourth lighting pulse
102 Rectified horizontal component
104 Counter-directional horizontal component
106 Electromagnetic beamer
108 Light strip
110 LED
112 Light sheet
116 Recording area
118 Multi-line line camera
120 Matrix camera
122 Time interval
124 Line space
126 Grid projection
128 Interface
130 Interface
132 Computer
201 Thought bubble
202 Thought bubble
203 Thought bubble
204 Thought bubble
205 Thought bubble
206 Thought bubble
207 Thought bubble m Length
n Length

What is claimed is:

1. A device for generating a photometric stereo image and a color image of an object which is moved at a predetermined relative speed relative to the device, the device comprising:
    a lighting area;
    a lighting arrangement which is oriented to the lighting area, wherein,
        the lighting arrangement is configured to cyclically emit a lighting sequence in the lighting area,
        the lighting sequence comprises at least four lighting pulses each of which have a wavelength range and a lighting direction,
        at least three of the at least four lighting pulses have a different wavelength range, and
        at least two of the at least four lighting pulses have a different lighting direction and a same wavelength range;
    a monochromatic image sensor arrangement comprising a recording area and at least four pixel fields which are spaced apart from one another at a predetermined spatial distance, the monochromatic image sensor arrangement being configured to measure brightness values in the recording area during each of the at least four lighting pulses; and
    an image data processor which is configured to,
        read out, after each of the at least four lighting pulses, the brightness values measured by the image sensor arrangement as image data records and to assign to each of the brightness values measured the respective wavelength range and the respective lighting direction of the respective lighting pulse, and
        to generate the photometric stereo image and the color image from the image data records,
    wherein,
        the recording area of the monochromatic image sensor arrangement and the lighting area overlap, and
        a time interval between two successive lighting pulses of the at least four lighting pulses of the lighting sequence is less than or equal to a time during which an image of the object projected onto the monochromatic image sensor arrangement pushes forward, at the predetermined relative speed, by a distance which is equivalent to the spatial distance of two neighboring pixel fields of the at least for pixel fields.

2. The device as recited in claim 1, wherein at least two of the at least four lighting pulses having the different wavelength range have a same lighting direction.

3. The device as recited in claim 1, wherein the wavelength range of the at least four lighting pulses cover an RGB color space.

4. The device as recited in claim 1, wherein at least one of the at least four lighting pulses forms a light sheet.

5. The device as recited in claim 1, wherein,
    the predetermined relative speed relative to the device is provided by conveying equipment.

6. The device as recited in claim 1, wherein,
    the monochromatic image sensor arrangement is a multi-line line camera or a matrix camera which is configured to read lines, and
    at least one of the measuring performed by the monochromatic image sensor arrangement in the recording area is constant and the predetermined relative speed of the conveying equipment is constant.

7. A method for generating a photometric stereo image and a color image of an object via the device as recited in claim 1, the method comprising:
    cyclically illuminating, via the lighting arrangement, a lighting area in which the object is located with a lighting sequence, wherein,
        the lighting sequence comprises at least four lighting pulses each of which have a wavelength range and a lighting direction,
        at least three of the at least four lighting pulses have a different wavelength range, and
        at least two of the at least four lighting pulses have a different lighting direction and a same wavelength range;
    moving the object through the lighting area and through a recording area of the monochromatic image sensor arrangement which is superimposed on the lighting area;
    recording, via the monochromatic image sensor arrangement, brightness values in the recording area during each of the at least four lighting pulses;
    reading out, via the image data processor, after each of the at least four lighting pulses, the brightness values measured by the image sensor arrangement as image data records and assigning to each of the brightness values measured the respective wavelength range and the respective lighting direction of the respective lighting pulse; and
    generating, via the image data processor, the photometric stereo image and the color image from the image data records,
    wherein,
    the cyclically illuminating, via the lighting arrangement, of the lighting area in which the object is located with the lighting sequence comprises:
        emitting one of the at least four lighting pulses in a first wavelength range from a first lighting direction, from a second lighting direction, from a third lighting direction, and from a fourth lighting direction, respectively;
        emitting one of the at least four lighting pulses in a second wavelength range from each of the first lighting direction, the second lighting direction, the third lighting direction, and the fourth lighting direction; and
        emitting one of the at least four lighting pulses in a third wavelength range from each of the first lighting direction, the second lighting direction, the third lighting direction, and the fourth lighting direction,
    wherein,
        none of the first wavelength range, the second wavelength range, and the third wavelength range are congruent, and
        none of the first lighting direction, the second lighting direction, the third lighting direction, and the fourth lighting direction are parallel, and
    a time interval between two successive lighting pulses of the at least four lighting pulses of the lighting sequence is less than or equal to a time during which an image of the object projected onto the monochromatic image sensor arrangement pushes forward, at a relative speed, by a distance which is equivalent to the spatial distance of two neighboring pixel fields of the at least for pixel fields.

8. The method as recited in claim 7, wherein, the moving of the object through the lighting area and through the recording area occurs at a predetermined relative speed via conveying equipment, the monochromatic image sensor arrangement which performs the measuring in the recording area is a multi-line line camera or a matrix camera which is configured to read lines, and at least one of the measuring performed by the monochromatic image sensor arrangement in the recording area is constant and the predetermined relative speed of the conveying equipment is constant.

9. The method as recited in claim 7, wherein, at least two lighting pulses of the at least four lighting pulses are emitted simultaneously in a same wavelength range, and at least two additional lighting pulses of the at least four lighting pulses are emitted simultaneously in a same wavelength range.

10. The method as recited in claim 7, wherein, four lighting pulses of the at least four lighting pulses are emitted simultaneously in a same wavelength range, four additional lighting pulses of the at least four lighting pulses are emitted simultaneously in a same wavelength range, and remaining lighting pulses of the at least four lighting pulses are emitted simultaneously or successively.

\* \* \* \* \*